United States Patent
Renner et al.

(10) Patent No.: US 10,836,122 B2
(45) Date of Patent: Nov. 17, 2020

(54) METHOD TO PRODUCE A FIBER REINFORCED ANNULAR BODY

(71) Applicant: MUBEA CARBO TECH GMBH, Salzburg (AT)

(72) Inventors: Christoph Renner, Gosau (AT); Sebastian Schmitz, Salzburg (AT)

(73) Assignee: MUMBEA CARBO TECH GMBH, Salzburg (AT)

( * ) Notice: Subject to any disclaimer, the term of this patent is extended or adjusted under 35 U.S.C. 154(b) by 89 days.

(21) Appl. No.: 15/550,711

(22) PCT Filed: Feb. 4, 2016

(86) PCT No.: PCT/EP2016/052381
§ 371 (c)(1),
(2) Date: Aug. 11, 2017

(87) PCT Pub. No.: WO2016/128289
PCT Pub. Date: Aug. 18, 2016

(65) Prior Publication Data
US 2018/0029314 A1    Feb. 1, 2018

(30) Foreign Application Priority Data
Feb. 11, 2015 (CH) .......................... 179/15

(51) Int. Cl.
*B29C 70/34* (2006.01)
*B60B 5/02* (2006.01)
(Continued)

(52) U.S. Cl.
CPC ............ *B29C 70/345* (2013.01); *B29C 70/32* (2013.01); *B60B 5/02* (2013.01); *B21D 53/30* (2013.01);
(Continued)

(58) Field of Classification Search
CPC ......... B29C 70/345; B29C 70/32; B60B 5/02; B60B 2900/321; B60B 2360/341;
(Continued)

(56) References Cited

U.S. PATENT DOCUMENTS 2,096,692 A * 10/1937 Cilley ................... F16D 69/02
192/107 M
2,584,142 A    2/1952 Lyon
(Continued)

FOREIGN PATENT DOCUMENTS

DE        198 41 779 A1    5/2000
DE    10 2005 041 940 A1    3/2007
(Continued)

OTHER PUBLICATIONS

Japanese Patent Office, Japanese Patent Application No. 2017-542180, dated Jul. 31, 2019 (8 pages), Office Action Summary in the English language (2 pages).

*Primary Examiner* — Sarang Afzali
(74) *Attorney, Agent, or Firm* — Pauley Erickson & Swanson (57) ABSTRACT

The invention is directed to a method for producing a rim (2) comprising at least one three-dimensionally shaped layer of reinforcing fibers (26). In a first step a forming tool (25) is provided which comprises a three-dimensionally shaped outer contour. In a subsequent step a band of reinforcing fibers (26) is wound onto the forming tool (25) such that the reinforcing fibers follow the outer contour of the forming tool (25) and are arranged in at least one of reinforcing fibers. A draping device (27) is provided by which the band of reinforcing fibers (26) is preformed before the band of reinforcing fibers (26) is wound onto the forming tool (25).

10 Claims, 4 Drawing Sheets

(51) Int. Cl.
| | |
|---|---|
| *B29C 70/32* | (2006.01) |
| *B21D 53/30* | (2006.01) |
| *B60B 1/00* | (2006.01) |
| *B29K 105/08* | (2006.01) |
| *B29K 307/04* | (2006.01) |
| *B29L 31/32* | (2006.01) |
| *B60B 1/06* | (2006.01) |

(52) U.S. Cl.
CPC .... *B29K 2105/089* (2013.01); *B29K 2307/04* (2013.01); *B29L 2031/32* (2013.01); *B60B 1/00* (2013.01); *B60B 1/06* (2013.01); *B60B 2360/341* (2013.01); *B60B 2900/111* (2013.01); *B60B 2900/321* (2013.01); *B60B 2900/572* (2013.01)

(58) Field of Classification Search
CPC ......... B60B 2900/111; B60B 2900/572; B60B 1/06; B60B 1/00; B21D 53/30; B29K 2307/04; B29K 2105/089; B29L 2031/32
See application file for complete search history.

(56) References Cited

U.S. PATENT DOCUMENTS

| | | | |
|---|---|---|---|
| 3,369,843 A | 2/1968 | Prew | |
| 3,811,737 A | 5/1974 | Lejeune | |
| 4,072,358 A | 2/1978 | Ridha | |
| 4,294,639 A | 10/1981 | Woelfel et al. | |
| 4,416,926 A | 11/1983 | Maglio | |
| 4,583,933 A | 4/1986 | Woelfel et al. | |
| 4,832,414 A | 5/1989 | Jones | |
| 4,900,097 A | 2/1990 | Kostov et al. | |
| 5,110,395 A * | 5/1992 | Vaniglia | B29C 53/8016 156/175 |
| 5,277,479 A | 1/1994 | Koyama et al. | |
| 6,347,839 B1 | 2/2002 | Lew et al. | |
| 6,470,936 B2 | 10/2002 | Pauc et al. | |
| 6,520,595 B1 | 2/2003 | Schlanger | |
| 9,724,961 B2 | 8/2017 | Renner | |
| 2007/0158997 A1 | 7/2007 | Raymond | |
| 2007/0164853 A1 | 7/2007 | Matsuda et al. | |
| 2008/0150348 A1 | 6/2008 | Douglas et al. | |
| 2010/0019564 A1 | 1/2010 | Theuer | |
| 2010/0127559 A1 | 5/2010 | Racicot et al. | |
| 2012/0049610 A1 | 3/2012 | Lew | |
| 2014/0375112 A1 | 12/2014 | Werner et al. | |
| 2016/0236424 A1 * | 8/2016 | Shimoda | B29C 70/32 |

FOREIGN PATENT DOCUMENTS

| | | |
|---|---|---|
| DE | 10 2010 010 512 A1 | 9/2011 |
| DE | 10 2010 010 513 A1 | 9/2011 |
| DE | 10 2011 087 936 B3 | 2/2013 |
| EP | 1 319 526 A2 | 6/2003 |
| FR | 2.113.996 | 6/1972 |
| GB | 1372357 | 10/1974 |
| JP | S55-133949 A | 10/1980 |
| JP | 1-215601 | 8/1989 |
| JP | H02-128958 A | 5/1990 |
| JP | 2004-509800 A | 4/2004 |
| JP | 2010-508200 A | 3/2010 |
| JP | 2015-16863 A | 1/2015 |
| WO | WO 94/22615 | 10/1994 |
| WO | WO 94/22679 | 10/1994 |
| WO | WO 2006/097856 A2 | 9/2006 |
| WO | WO 2010/138557 A1 | 12/2010 |
| WO | WO 2011/000070 A1 | 1/2011 |
| WO | WO 2013/083729 A2 | 6/2013 |

* cited by examiner

METHOD TO PRODUCE A FIBER REINFORCED ANNULAR BODY

BACKGROUND OF THE INVENTION

Field of the Invention

The present invention is directed to a method to producing a fiber reinforced annular product made from composite material such as a rim of a vehicle wheel and to a device suitable to produce a fiber reinforced annular body according to the method.

Wheels for vehicles must meet a comprehensive list of requirements. This includes specific dimensions in order to fit a specific type of vehicle, a minimum mechanical competence, a low total weight, a specific mass distribution, durability and visual appearance. In order to improve driving characteristics, total weight and moment of inertia should be minimized.

Fiber reinforced plastics offer great potential in order to decrease total weight and moment of inertia of wheels, while maintaining high mechanical competence of such wheels. Therefore in recent years a variety of wheels comprising fiber reinforced plastics have emerged. This includes wheels being substantially integrally made from fiber reinforced plastics, as well as so called hybrid wheels which are made from fiber reinforced plastics as well as conventional materials, such as metals. In hybrid wheels, usually the rim is made from fiber reinforced plastics, whereas the wheel center is made from a lightweight metal alloy, such as aluminum. Within the context of the present invention "wheel center" should be understood as to include any type of wheel center, such as spoke structures, respectively wheel spiders or wheel disks.

However a major drawback of wheels comprising fiber reinforced plastics if compared to wheels made from conventional materials solely is that their production is in general more labor-intensive and requiring high manual skills. On the one hand this makes wheels comprising fiber reinforced plastics relatively expensive, if compared to conventional wheels which can be made using automated forging and casting technologies. On the other hand, the variety of manual production steps necessary to build up a wheel made from fiber reinforced plastics anticipates the production of wheels with highly reproducible characteristics. Therefore methods in order to automate the production of wheels comprising fiber reinforced wheels are needed.

Discussion of Related Art

In the prior art several approaches are proposed in order to automate the production of wheels comprising fiber reinforced plastics.

DE102011087936 B3 was published in February 2013 in the name of ThyssenKrupp Carbon Components GmbH. It describes a wheel made from a fiber reinforced plastic and a method for producing such a wheel. According to the document a wheel is characterized by layers of reinforcing fibers which extend from the rim well over the outer rim bead to a wheel disk without interruption. The process to manufacture such a wheel comprises lay-up of reinforcing fibers on a forming tools which are essentially cylindrically shaped. In order to build the wheel disk, reinforcing fibers are laid on contour surfaces of essentially cylindrically shaped auxiliary forming tools. Subsequently said auxiliary forming tools are removed and the laid fibers are folded into a plane, which is perpendicular to the rotation axis of the wheel.

DE102005041940 A1 was published in March 2007 in the name of ThyssenKrupp Carbon Components GmbH. The document describes a wheel made from a fiber reinforced plastic as well as a method for producing such a wheel. A wheel according to the invention comprises an auxiliary tool which at least partially defines the geometry of the resulting wheel. According to the document said auxiliary tool is wrapped by a braided hose which is inserted into a central bore at the rotation axis of the resulting wheel.

DE102010010512 A1 was published in September 2011 in the name of Leichtbau-Zentrum Sachsen GmbH. It describes a method for producing a wheel with a rim in a tool. A prefabricated wheel disc is provided which is then interconnected to a rim in a form-fit manner. During the manufacturing process the wheel disc is partially enclosed in the tool during depositing fiber material on an encompassing surface.

DE102010010513 A1 was published in September 2011 in the name of Leichtbau-Zentrum. Sachsen GmbH. It describes a method for producing a wheel with a rim in a tool. A prefabricated wheel disc is provided which is then interconnected to a rim in a form-fit manner. During the manufacturing process the wheel disc is partially enclosed in the tool and then the rim is formed by braiding fibers onto an outer surface of the tool.

WO13083729 was published in June 2013 in the name of the same applicant. It describes a wheel made from a fiber reinforced material. The wheel comprises an insert in the center of the wheel which is partially embedded in the composite material.

The production methods applied to fiber reinforced composite material known from the prior art in general require fiber material which only has a relatively low mechanical competence (such as braided fibers) if compared to other types of reinforcing structures such as layers of unidirectional fibers and fabrics. As well, they do not offer a satisfying solution for one of the major problem when laminating fiber material other than braided fibers, which is the application of planar fiber material on the curved surface of a forming tool for annular bodies, so-called draping.

SUMMARY OF THE INVENTION

It turned out that the proper application of planar fiber material to the curved surface of a forming tool (tool) for an annular body made at least partially out of composite material is a major problem when trying to automate the production of annular bodies. In particular rims for wheels usually have a relatively complex surface curvature. The cross-section typically comprises rim edges, rim shoulders, rim humps and a rim well which requires adoption of the fibers to the contour. In addition the several elements and sections usually do have different wall thickness and fiber orientation, respectively layout. Furthermore reinforcing elements may be foreseen to achieve the required specifications.

In order to apply a continuous essentially planar fabric on the peripheral surface, the complex three-dimensional curvature has to be taken into account in order to obtain good results, i.e. without detrimental wrinkles. Within the context of the present invention, "fabric" should be understood as to include not only bi-axial fabrics, but also uni-axial fabrics as well as triaxial and other fabrics. In addition, the local deviation of the draped fabric's fibers ideally should be well balanced when assessed in circumferential direction in order to obtain a wheel with material properties that are continuous in circumferential direction. Usually multiple layers of the same or different fabrics are needed in order to obtain sufficient rim thickness and mechanical competence, improper draping occurring in the individual layers may sum-up during the lamination process, leading to increased imperfection in the laminate when increasing the number of layers. In addition circumferential reinforcement elements may be required. It is therefore an aspect of the present invention to provide a method which allows accurate lamination of multiple layers of fabric on an annular forming tool, such as a forming tool for a rim, respectively for a wheel.

In a preferred embodiment a wind-up arrangement is foreseen which comprises a draping device to wind a rim or part thereof by winding-up one or several bands of reinforcing fibers and if required other reinforcement elements such as e.g. unidirectional sowings directly or indirectly onto a three-dimensionally contoured forming tool which at a later stage can be removed again. The bands of reinforcing fibers may all have the same or different width. If appropriate the forming tool can be covered by an additional layer of material such as e.g. an appropriately shaped foil. The additional layer of material can be foreseen as a production aid only. Depending on the field of application it can remain on the final part and/or be removed at a later stage. If appropriate the additional layer of material can be foreseen as an outer layer which remains on the final part and e.g. protects the reinforcing fibers. The bands of reinforcing fibers are be wound onto the forming tool either by rotating the forming tool and/or by rotating the bands of reinforcing fibers around the forming tool. The forming tool may stand still or perform an oscillating movement in axial direction.

To obtain best results a draping device is foreseen which is used in order to continuously deform a previously planar fabric or continuum sheet of material prior to applying it on the forming tool, respectively on layers that had been applied on the forming tool before. One aim is to smoothly preform the fabric or sheet of material in a controlled and continuous manner before it is laid down in the final position onto the three-dimensionally shaped outer contour of the forming tool, respectively a previous layer. The draping device can be rigid or itself deformable to adjust the pre-forming process. Alternatively or in addition the draping device can be adjustable with respect to the forming tool thereby allowing adjustability of the process. Hence, the planar material is already at least partially deformed before being applied to a forming tool with a curved surface.

Good results for many different types of planar materials and a variety of forming tools with different shapes may be obtained if the draping device comprises a slide (first shell-like structure) which has a contour-forming first surface, a feeding end and a delivering end. During production the material enters the slide by the feeding end and is guided over contour-forming first surface to the second end. In addition the material may be guided by rails, plates, rollers or other means. Between the feeding end and the delivering end the shape of the contour-forming first surface changes preferably in a continuous manner. The draping device may further comprise a second shell-like structure which has at least one contour-forming second surface that during production at least partially aligns with the first surface. Thus the material to be deformed is guided between the first and the second contour-forming surfaces. In a preferred variation the slide has a curved sickle-shaped design. The slide is preferably arranged around the forming tool at a certain distance to it which in the direction of the material movement (sliding direction) decreases. Thereby it is achieved that the material do be deformed is automatically pulled onto the slide.

Good results with low damage to the fibers and a controlled constant distortion of the same may be obtained if the first surface of the first shell-like structure and/or the first shell of the second shell-like structure is/are at least partially made from a material with a relatively low coefficient of friction. Hence, a shell-like structure may be entirely made of such a material or may be coated with such a material or may comprise inlays made from such a material. Depending on the application, the first surface of a shell-like structure may also comprise regions with varying coefficients of friction. Such a variation may be advantageous in order to control the local deviation of the fibers of a fabric. Alternatively or in addition, the spacing between the first shell-like structure and the second shell-like structure may be varying, depending on the location. Thus, the local distortion of the fibers can be controlled. According to another aspect of the present invention, a protective sheet/layer may be applied to one or both sides of the planar material which has to be deformed, prior (upstream) to the draping device and removed again (downstream) before the deformed material is applied to the forming tool. Depending on the materials to be processed, a drafting device (e.g. the slide) may comprise means which allow heating or cooling of the material. Alternatively or in addition such heating and/or cooling may be used in order to deform continuum thermoplastic material.

Good results may be achieved if at least the first shell-like structure is at least partially flexible and can be deformed. Thus, by deforming the shell-like structure the form of the draping device may be altered in order to use it for different types of annular bodies. As well such adjustability may be used in order to apply the same type of draping device to multiple types of materials. As well, such a variation of a draping device may be used for fine-tuning adjustment during production. In order to obtain a draping device with such a flexibility, a draping device may be at least partially made from an elastic material and/or may be built of from multiple components which are interconnected by joints.

Good results may be obtained if at least a portion of the draping device has an arcuate shape, the arc axes being substantially in parallel with the axis of rotation of the forming tool of the annular body to be produced. Such a variation of a draping device may offer multiple advantages. First, such a variation allows setting up a relatively long deformation path without substantially increasing the total spatial dimensions of the whole production facility, as will be explained in further details below. Using relatively long deformation paths allows to obtain highly reproducible and uniform deformation of the planar material. Second, using an arcuate draping device allows not only deforming the material to the contour of an annular body in the axial direction, but also to account for the curvature in circumferential direction. Thus e.g. the formation of wrinkles can be prevented more reliably.

Annular bodies (e.g. rims) with specifically good mechanical properties can be obtained if the deformed material applied to the forming tool is compressed in radial direction (in centripetal direction) of the annular body in order to obtain a compact lay-up. Accordingly, if appropriate a compaction device is provided which may be used in combination with a draping device as disclosed herein. However, such a compaction device may also be used independently from the other devices and methods disclosed in the present application and thus can be considered to be an independent inventive concept. Depending on the type of annular body which has to be produced and/or the type of material that has to be applied on the forming tool, the compaction device may comprise a shell-like structure which applies force normal to the surface of the material to be compacted on a certain area and which remains substantially stationary during the whole compaction process with respect to the circumferential direction. The compaction device may comprise at least one roller which is used to compress layers present on a forming tool. By using such a roller, a specified force can be applied in order to compact a specific portion of a cross-section of an annular body. Respectively using multiple rollers, different portions of a cross-section may be compacted at different magnitudes. The rollers may be used in order to position the layers applied on a forming tool and/or to give it a specific shape. Such a variation of the invention may e.g. be advantageous for some types of annular bodies which have a relatively complex curvature. If appropriate, a compaction device may also comprise a combination of at least one shell-like structure and at least one roller. Thus, also annular bodies with cross-sections that comprise large straight portions and portions with complex curvatures can be compacted in a controlled manner.

A further independent inventive concept relates to a lay-up for an annular body, such as a rim, comprising a fiber reinforced plastic. Such a lay-up represents an independent inventive concept that can be advantageous regardless of the method and the means used to produce it. However combining the method to produce a fiber reinforced annular body (e.g. a rim) according as disclosed in the present application together with a draping device disclosed herein in order to produce an annular body with a lay-up as disclosed herein allows highly automated production of high quality annular bodies with a reproducible mechanical competence. According to this variation of the invention, an annular body is reinforced locally using one or several bundles of reinforcing fibers, so called rovings which are normally arranged in circumferential direction. According to this aspect of the invention, rovings can be used in order to influence the profile (cross-section) of an annular body, such as to create thickenings in the rim of a wheel. Such thickenings may be used in order to form a rim's inner and/or outer edge. However, according to the present invention, such rovings may also be used in order to build up humps. Alternatively or in addition, such rovings may also be applied in order to strengthen the general structure of a wheel. Hence e.g. for a rim, such rovings may also be applied in regions of the shoulders other than the hump, as well as in the rim well, such as in the region where the rim center joins the rim. Thus in particular damage tolerance of a rim (respectively wheel) made from a fiber reinforced plastic can be increased. Rims (respectively wheels) comprising reinforcements made from rovings according to this variation of the invention show significant less catastrophic failure when damage is introduced, than rims/wheels without such rovings. The present invention is advantageous not only to process pre-impregnated fibers (prepregs) but also to alternatively or in addition process dry fibers to which the matrix material is applied e.g. by resin transfer molding (RTM). The rims described herein are preferably used in wheels comprising a wheel center made out of composite material. One example is described in the drawings. However the rims may also be used in so called hybrid wheels comprising a wheel center made at least partially out of a different material such as metal.

A method for producing a rim according to the invention can be summarized as follows: In a first step a forming tool is provided which comprises a three-dimensionally shaped outer contour. In a subsequent step a band of reinforcing fibers is wound onto the forming tool such that the reinforcing fibers follow the outer contour of the forming tool and are arranged in at least one layer of reinforcing fibers around the forming tool. If appropriate an intermediate layer as described above can be foreseen. By a draping device the band of reinforcing fibers is preformed before the band of reinforcing fibers is wound onto the forming tool. The draping device may comprise a slide over which the band of reinforcing fibers is moved and thereby deformed. In a preferred embodiment the slide is sickle-shaped. The slide can be arranged around the forming tool. Good results can be obtained if the band of reinforcing fibers is preformed at least partially continuously from a flat cross-section into a curved cross-section which corresponds to the outer contour of the forming tool or a previous layer already present on the forming tool. The band of reinforcing fibers can be an unidirectional fabric and/or a biaxial fabric and/or a triaxial fabric and/or a quadraxial fabric and/or a roving. At least part of the band of reinforcing layer can be relocated before an additional layer of reinforcing fibers is applied. The relocation can take place e.g. around a circumferential reinforcing element. At least part of the band of reinforcing fibers can be folded over forming a loop.

BRIEF DESCRIPTION OF SEVERAL VIEWS OF THE DRAWINGS

The herein described invention will be more fully understood from the detailed description given herein below and the accompanying drawings, which should not be considered as limiting to the invention described in the appended claims.

The drawings showing in a simplified and schematic manner.

DETAILED DESCRIPTION OF THE INVENTION

The foregoing summary as well as the following detailed description of embodiments is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
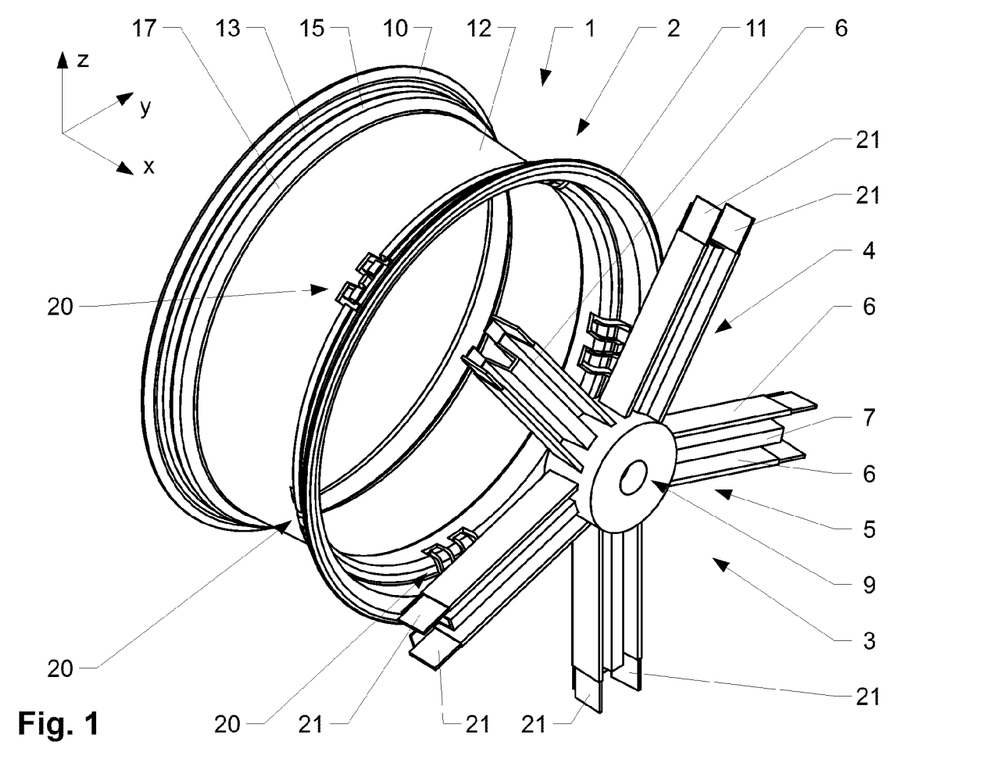
FIG. 1 is a wheel in a disassembled manner.

FIG. 1 is showing an example of a wheel 1 comprising a rim 2 made according to the invention. The wheel 1 further comprises a wheel center 3 made primarily out of composite material having several spokes 4 interconnecting a wheel flange 5 arranged in the center of the wheel center 3 with the rim 2. Not only the rim 2 but also the wheel center 3 are in the shown embodiment made out of composite materials, preferably carbon fibers and/or Kevlar fibers and/or glass fibers and/or material fibers, etc. embedded in a matrix material, such as epoxy resin.

In the shown embodiment, the rim 2 comprises in a final state an inner and an outer rim edge 10, 11 between which a rim well 12 extends. Adjacent to the inner and the outer rim edge 10, 11 an inner and an outer bead seat 13, 14 are arranged, which are delimited from the rim well 12 by an inner and an outer hump 15, 16. The difference in level between the smaller diameter of the rim well 12 and the larger diameter of the inner and the outer humps 15, 16 is bridged by an inner and an outer shoulder 17, 18. The making of the rim 2 is described in more detail in accordance with FIGS. 3 through 6. An example of a section of the rim 2 is shown in FIG. 7.

The spokes 4 are interconnected to the rim 2 in a mechanically advantageous way as will be explained subsequent in a detailed manner. The spokes 4 of the shown wheel 1 are having an open cross-section, which is accessible from the inside and the outside when viewed in axial direction (x-axis) of the wheel 1 and which is comparably easy to produce. Each spoke 4 comprises two lateral flanges 6 and an intermediate rib 7, which in the shown embodiment per-se has a U-shaped cross-section when cut transversal to the radial direction. The lateral flanges 6 and the intermediate rib 7 are interconnected on the rear side by a cross wall 8 which in the shown embodiment is arranged at the inner end of the lateral flanges 6. To assemble the wheel 1 a rim 2 and a wheel center 3 are provided which are prepared independent from each other. These parts are shown here in an idealistic manner. This also means that the wheel center 3, namely the wheel spokes 4 may have a different design, i.e. with a different cross section (open and/or closed). Under a closed cross section a cross section is understood which is in itself closed forming a loop. It should be understood that in the process of assembling the rim 2 and the spokes 4, normally at least the fibers forming the spokes 4 may be in a non-solid and thereby still deformable condition. Alternatively or in addition also the composite material forming the rim 2 can be in a non-completely cured state when assembled with the wheel center 3.

In the rim 2 openings 20 are provided which in principle correspond to the layout of the (final) cross-section of the spokes 4. The openings 20 extend in a radial direction through the rim 2. Good results may be achieved by sharp contoured laser-cutting of the openings 20 matched to the cross-section of the spokes 4.

In the shown embodiment, the openings 20 are arranged adjacent to the outside of the rim 2 in the area of the rim well 12, the outer bead seat 14, the outer hump 16 and the outer shoulder 18. The openings 20 are foreseen to receive at least one butt strap 21, which protrudes at the outer end of a spoke 4. They may later be covered on the outside by additional layers of material in at least one further process step. This can be achieved by the device and the method explained in accordance with FIGS. 3 through 6.

Figure 2:
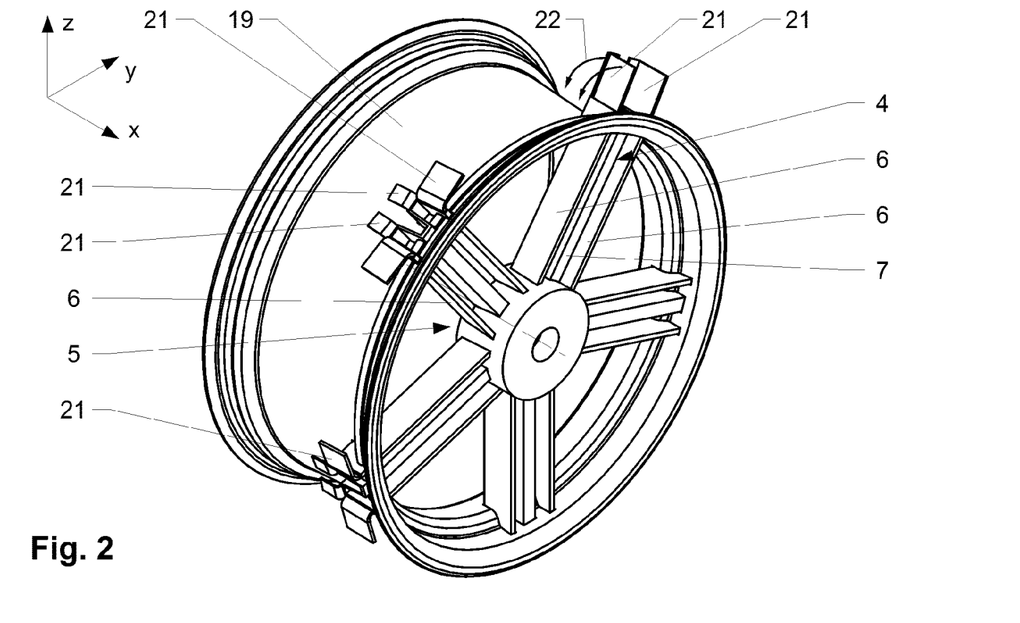
FIG. 2 shows the wheel according to FIG. 1 in an assembled manner.

As explained above, the rim 2 and the spokes 4 for the wheel center 3 are preferably prepared independent from each other and then assembled in a further step with respect to each other, whereby the butt straps 21 of the spokes 4 are laced through the openings 20 and folded down on a surface 19 of the rim 2 as schematically indicated in FIG. 2 by lines 22. The fibers of the butt straps are preferably expanded to obtain best load introduction and exchange of forces between the rim 2 and the wheel center 3. The surface 19 may be covered in a later step, e.g. when additional layers of material are applied as described subsequent. The material forming a radially inner section of the rim 2 is in the present step normally in a cured or in a semi cured state. If appropriate it may act as a tool for forming of the still formable fibers for the spokes 4.

In a further process step the composite material forming the spokes 4 and the butt straps 21 are cured by setting the resin in which the reinforcement fibers are embedded. Furthermore, the insert 9 is embedded in the wheel flange 5. This step normally takes place by inserting the wheel center 3 as well as the insert 9 in a corresponding mould (i.e. forming tool; not shown in detail), closing the mould and initiating the curing process of the matrix. If appropriate, the rim 2 can be also included in the mould or form part of it, e.g. by acting as a wall of the mould.

The fibers later forming the wheel 1 can be in the state of a semifinished product when they are assembled as shown in FIG. 2. Alternatively or in addition, the fibers are at least partially in a dry state. The matrix material is then added e.g. by applying a vacuum and/or pressure to the mold (RTM process).

In the final product the fibers of the butt straps 21 extend at least partially across the rim 2 and then in circumferential direction and/or transversal direction in or along an outer surface 19 of the rim 2. The butt straps 21 are following the outer contour, respectively are firmly integrated in the outer surface 19. The openings 20 are normally completely filled in and are therefore not present anymore. If appropriate, the outer surface 19 can be covered at least partially by additional composite material or another cover. For making of the rim 2 and the wheel center 3 usually two separate tools are used. A tool and a process for making of the rim 2 are shown and explained in accordance with FIGS. 3 through 6.

Figure 3:
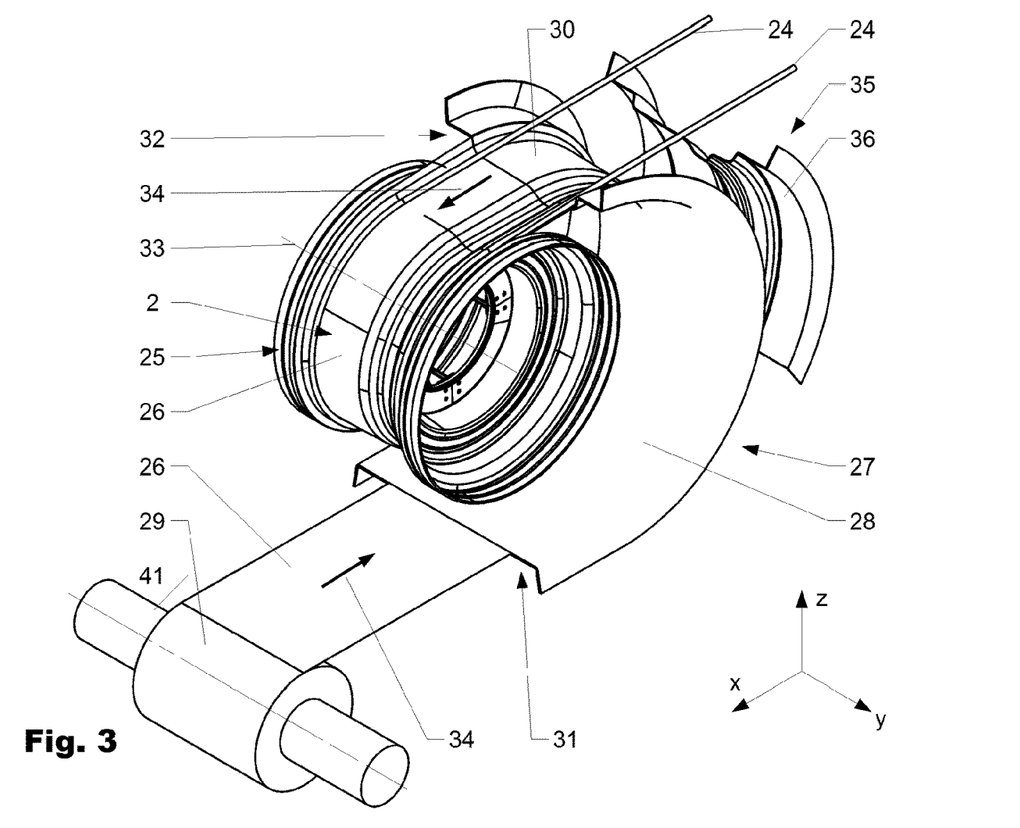
FIG. 3 shows the making of a rim or part thereof in a perspective view.
Figure 4:
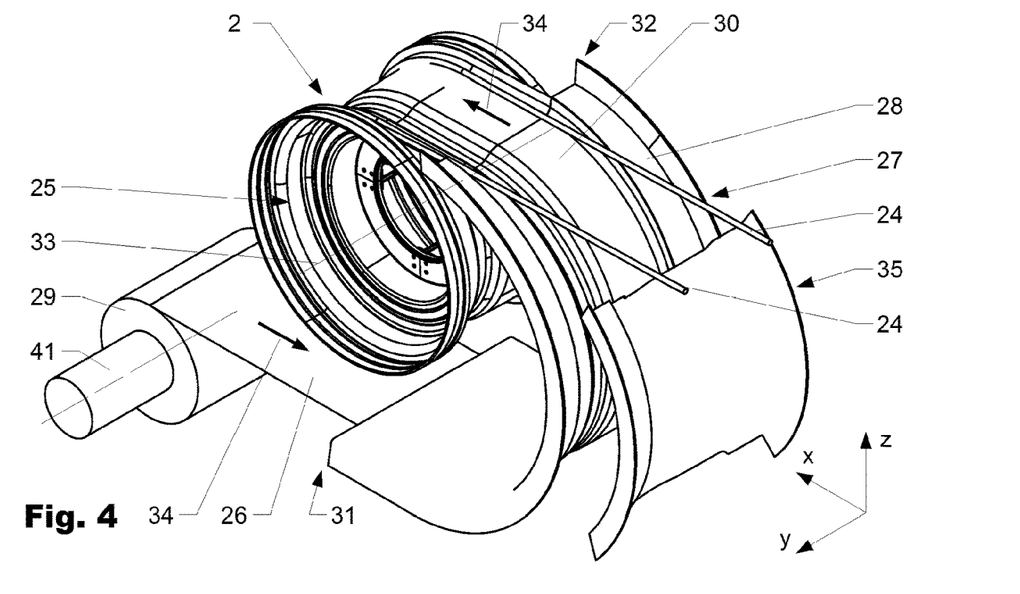
FIG. 4 shows the process according to FIG. 3 in a perspective view from the opposite side.

FIGS. 3 and 4 are showing in a schematic and exemplary manner the process of making a rim 2 according to the invention. As e.g. can be seen in FIG. 1 the rim 2 is an annular, three-dimensionally shaped body made out of layers of reinforcing fibers which at least partially are defining the three-dimensionally shaped inner circular contour of the rim 2. If appropriate the inner contour of the rim 2 can be covered on the inside by a layer of protective material (not shown in detail) as described above. In a first step a forming tool 25 which at least partially defines the three-dimensionally shaped inner contour of the rim 2 is provided. Depending on the shape of the rim 2 to be made the forming tool 25 can be split in axial direction such that the rim can easily be taken off the forming tool 25. In a subsequent step a band 26 of reinforcing fibers is wound onto the forming tool 25 such that the reinforcing fibers follow the contour of the forming tool 25, respectively the underneath previous layer. A draping device 27 helps to preform the at least one band 26 before the band is wound onto the forming tool 25.

In the shown embodiment the draping device 27 comprises a slide 28 (first shell-like structure) over which the band moves on its way from a bobbin 29 to the forming tool 25. The slide 28 has a contour-forming first surface 30 with a feeding end 31 and a delivering end 32. During the winding process the forming tool 25 rotates around a first axis 33 relative to the slide 28, respectively the bobbin 29. In the shown embodiment the forming tool 25 rotates and the bobbin 29 and the slide 28 are arranged stationary. However under certain circumstances it would also be possible to rotate the slide 28 and the bobbin 29 and to arrange the forming tool 25 stationary. As it can be seen the band 26 enters the slide 28 by the feeding end 31 and is guided over contour-forming first surface 30 to the second end 32 in the direction of arrow 34. In addition the material may be guided by rails, plates, rollers or other means which are here not shown in detail. Between the feeding end 31 and the delivering end 32 the shape of the contour-forming first surface 30 changes preferably in a continuous manner (if appropriate other shapes, e.g. non continuous are possible. The draping device 27 may further comprise a secondary slide 35 which preferably has at least one contour-forming surface 36 that during production may at least partially align with the first surface 30 from the outside. Thus the material to be deformed is guided between the first and the second contour-forming surfaces 30, 36. In the shown embodiment the slide 28 has a curved sickle-shaped design. The slide is preferably arranged around the forming tool 25 in radial direction at a certain distance to it which in the direction of the material movement (sliding direction) decreases until the preformed band 26 is laid down onto the forming tool 25. By this shape of the slide it is automatically achieved that the band 26 is automatically pulled onto the forming surface 30 of the slide 28. Good preforming performance can be achieved in that at least the forming surface 30 of the first slide 28 and/or the forming surface 36 of the secondary slide 35 is/are at least partially made from a material with a low coefficient of friction. Hence, a shell-like structure may be entirely made of such a material or may be coated with such a material or may comprise inlays made from such a material. Depending on the application, the first surface of a shell-like structure may also comprise regions with varying coefficients of friction. Such a variation may be advantageous in order to control the local deviation of the fibers of a fabric. If appropriate matrix material can be applied to the band of reinforcing fibers when the band of reinforcing material is in contact with the draping device.

If appropriate reinforcing elements here in the form of one or several rovings 24 can be added to the manufacturing process. The ravings 24 can be guided over the slide 28 or (as shown here) in a separate manner. The band 26 can be folded around the rovings 24 if appropriate as schematically indicated in FIG. 7 by lines 23. The rovings 24 are preferably arranged in the outer zones of the rim 2, e.g. in the area of the inner hump 15 and/or the outer hump 16 and/or the inner bead 13 and/or the outer bead 14. The rovings 24 are normally arranged parallel to each other encompassing the forming tool 25 in one or several loops.

Alternatively or in addition, the spacing between the first shell-like structure and the second shell-like structure may be varying, depending on the location, respectively the amount of band wound onto the forming tool 25. Thus, the local distortion and the tension in the fibers can effectively be controlled. According to another aspect of the present invention, a protective sheet/layer (not shown in detail) may be applied to one or both sides of the band 26 which has to be preformed by the slide 28 of the draping device 27 and removed again (downstream) before the deformed material is applied to the forming tool 25. Depending on the materials to be processed, a drafting device (e.g. the slide) may comprise means which allow heating or cooling of the material during and/or before and/or after the preforming process. Alternatively or in addition such heating and/or cooling may be used in order to deform continuum thermoplastic material.

If appropriate the slide 28 can be designed at least partially flexible such that it can be deformed in a controlled manner. Thus, by deforming the slide 28 or a part thereof shape of the draping device 27 may be altered in order to use it for different types of annular bodies or during the process when the geometry of the rim 2 arranged on the forming tool 25 changes due to the amount of reinforcing fibers laid down on the forming tool 25. Thereby it is possible to actively compensate the altering geometry during the process. As well such adjustability may be used in order to apply the same type of draping device 27 to multiple types of materials or geometries. As well, such a variation of a draping device 27 may be used for fine-tuning adjustment during production. In order to obtain a draping device 27 with such a flexibility, a draping device may be at least partially made from an elastic material and/or may be built of from multiple components which are interconnected by joints and which are thereby moveable with respect to each other.

Rims 2 with good mechanical properties can be obtained if the reinforcing fibers 26 are compressed in radial direction (in centripetal direction) of the forming tool 25 in order to obtain a compact lay-up and/or to press out unwanted matrix material. Accordingly, if appropriate a compaction device is provided which may be used in combination with a draping device as disclosed herein. However, such a compaction device may also be used independently from the other devices and methods disclosed in the present application and thus can be considered to be an independent inventive concept. Depending on the type of annular body which has to be produced and/or the type of material that has to be applied on the forming tool, the compaction device may comprise a shell-like structure which applies force normal to the surface of the material to be compacted on a certain area and which remains substantially stationary during the whole compaction process with respect to the circumferential direction. The compaction device may comprise at least one roller which is used to compress layers present on a forming tool. By using such a roller, a specified force can be applied in order to compact a specific portion of a cross-section of an annular body. Respectively using multiple rollers, different portions of a cross-section may be compacted at different magnitudes. The rollers may be used in order to position the layers applied on a forming tool and/or to give it a specific shape. Such a variation of the invention may e.g. be advantageous for some types of annular bodies which have a relatively complex curvature. If appropriate, a compaction device may also comprise a combination of at least one shell-like structure and at least one roller. Thus, also annular bodies with cross-sections that comprise large straight portions and portions with complex curvatures can be compacted in a controlled manner.

Figure 5:
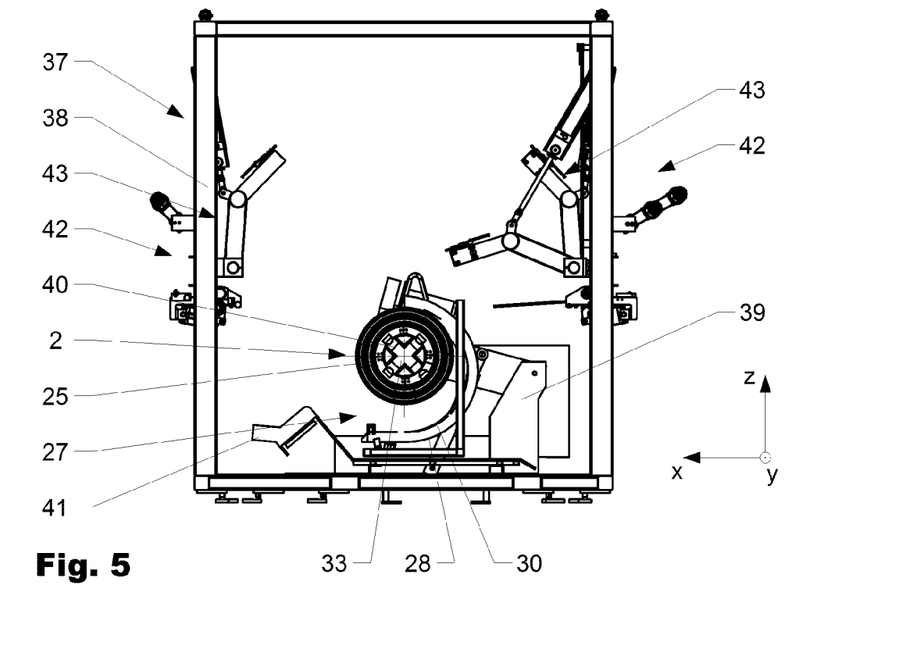
FIG. 5 shows a winding device in a front view.
Figure 6:
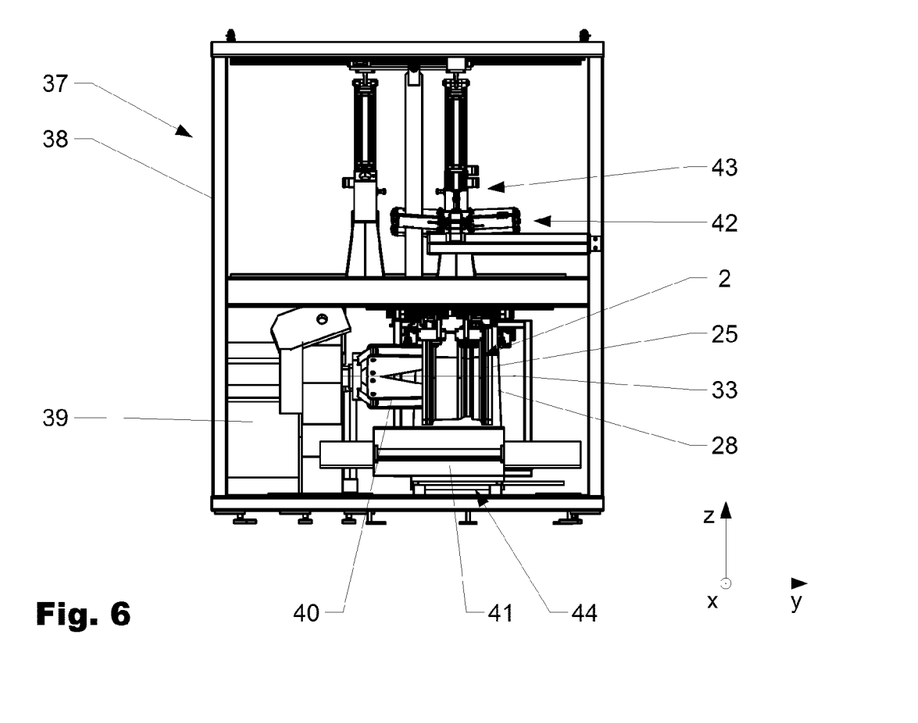
FIG. 6 shows the winding device according to FIG. 5 in a side view.
Figure 7:
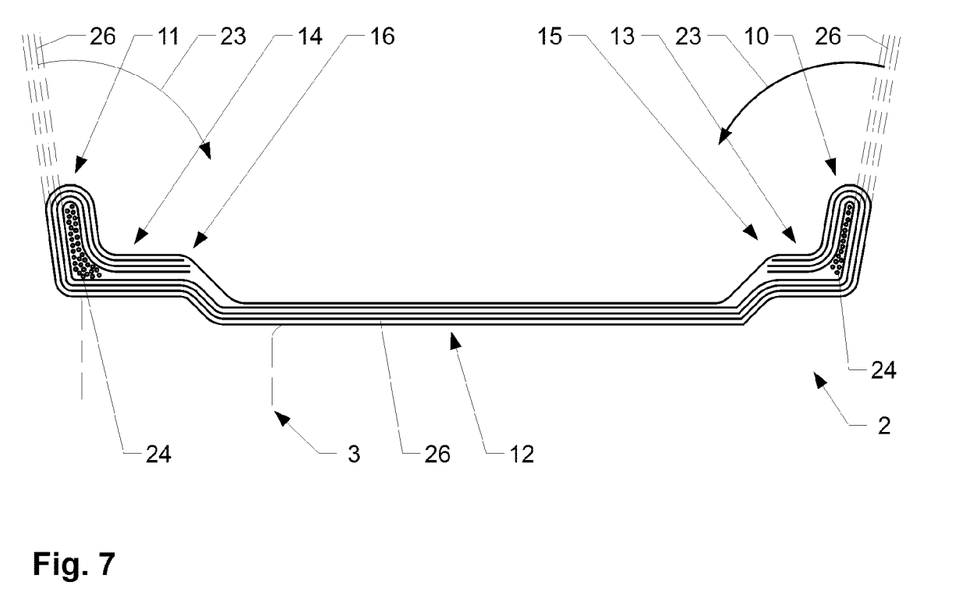
FIG. 7 is a cross section of a rim.

FIGS. 5 and 6 are showing a winding device 37 in a front view and in a side view. The principle functionality corresponds to the process as describe in accordance with FIGS. 3 and 4. Therefore for the general explanation reference is made to said drawings and the thereto related description. The winding device 37 comprises a frame 38 in which a forming tool 25 can be arranged on a drive unit 39 comprising a hub 40 which is rotatable around the rotation axis 33 by the drive unit 39. The hub 40 allows easy fixation of one or several forming tools 25. A stand 41 is foreseen to receive the bobbin 29 (here not shown, see FIGS. 3 and 4). Depending on the field of application the winding device 37 can be designed such that the bobbin 29 can be actively driven by driving means and/or slowed down by breaking means (both not shown in detail) to adjust the tension in the band 26 (see above). Additional tools 42 and/or production aids 43 are fixed to the frame 38 in a swiveling manner such that they can be swiveled into the right position when needed and stored if not required. In the shown embodiment the stand 41 for the bobbin 29 can be moved in lateral direction (y-direction), e.g. for adjusting reasons. It is therefore arranged on linear guiding means here arranged at the bottom of the frame 38. The draping device 27 may (as shown here) be arranged in an adjustable and/or swiveling manner.

FIG. 7 is showing a section of the rim 2 in a schematic manner. The rim 2 comprises several layers of reinforcing fibers 26 which extend between the inner and the outer rim edge 10, 11. The inner and the outer rim edges 10, 11 comprise reinforcing elements in the form of rovings 24 which are arranged in circumferential manner. It should be understood that by the process and the machinery described above it is possible to add additional reinforcing elements at other positions in the rim 2. As it can be seen the rovings 24 are embedded in the layers of the reinforcing fibers 26. This can be achieved in that the layers 26 are at least partially folded in around the rovings 24. This is preferably done while the rim 2 is still arranged on the forming tool 25. As it can be seen the layers of fibers 26, i.e. fabrics etc. as described above, extend continuously from the inner to the outer rim edge 10, 11. Thereby very good results can be achieved. Alternatively or in addition the fibers 26 can have a shorter length in transversal direction.

The invention claimed is:

1. A method for producing an annular rim comprising at least one three-dimensionally shaped layer of reinforcing fibers, the method comprising the steps of:
   a. providing an annular forming tool comprising a three-dimensionally shaped outer contour;
   b. providing a draping device including a slide with a curved and contoured outer surface;
   c. preforming a band of reinforcing fibers, at least partially continuously by moving the band of reinforcing fibers on and over the curved and contoured outer surface of the slide, from a flat cross-section into a curved cross-section which corresponds to the outer contour of the forming tool or a previous layer already present on the forming tool; and
   d. winding the preformed band of reinforcing fibers onto the forming tool such that the reinforcing fibers follow the outer contour of the forming tool and are arranged in at least one layer of reinforcing fibers around the forming tool to form the annular rim.

2. The method according to claim 1, wherein at least part of the band of reinforcing fibers is moved from the three-dimensionally shaped outer contour before an additional layer of reinforcing fibers is applied.

3. The method according to claim 2, wherein at least part of the band of reinforcing fibers is folded over, forming a loop.

4. The method according to claim 3, wherein at least part of the band of reinforcing fibers is folded over a circumferential arranged reinforcing element.

5. The method according to claim 1, wherein the slide has a sickle-shaped curve.

6. The method according to claim 5, wherein the slide is arranged around the forming tool.

7. The method according to claim 1, wherein the band of reinforcing fibers is continuously preformed before the winding onto the forming tool.

8. The method according to claim 1, wherein the band of reinforcing fibers is at least one of: a unidirectional fabric, a biaxial fabric, a triaxial fabric, a quadraxial fabric, and a roving.

9. The method according to claim 1, wherein the winding includes a winding device comprising the draping device to preform the band of reinforcing fibers and a hub to receive the forming tool, wherein the forming tool is arranged rotatable with respect to the draping device such that the band of reinforcing fibers can be wound in at least one layer onto the forming tool.

10. A method for producing an annular rim comprising at least one three-dimensionally shaped layer of reinforcing fibers, the method comprising the steps of:
   a. providing an annular forming tool comprising a three-dimensionally shaped outer contour;
   b. at least partially continuously preforming the band of reinforcing fibers about a curved and contoured outer surface of a slide of a draping device before the band of reinforcing fibers is wound onto the forming tool, wherein the band of reinforcing fibers is moved and thereby deformed on and over the curved and contoured outer surface of the slide and is preformed from a flat cross-section into a preformed band of reinforcing fibers comprising a curved cross-section corresponding to the outer contour of the forming tool or a previous layer already present on the forming tool; and
   c. forming the annular rim by winding the preformed band of reinforcing fibers around the forming tool such that the reinforcing fibers follow the outer contour of the forming tool and are arranged in at least one layer of reinforcing fibers around the forming tool.

* * * * *

UNITED STATES PATENT AND TRADEMARK OFFICE
CERTIFICATE OF CORRECTION

Page 1 of 1

PATENT NO. : 10,836,122 B2
APPLICATION NO. : 15/550711
DATED : November 17, 2020
INVENTOR(S) : Christoph Renner et al.

It is certified that error appears in the above-identified patent and that said Letters Patent is hereby corrected as shown below:

On the Title Page

Replace "(73) Assignee: MUMBEA CARBO TECH GMBH" with -(73) Assignee: MUBEA CARBO TECH GMBH- Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*